United States Patent
Lee et al.

(10) Patent No.: US 12,323,228 B2
(45) Date of Patent: *Jun. 3, 2025

(54) SUPPORT FOR ADDITIONAL DECODING PROCESSING TIME IN WIRELESS LAN SYSTEMS

(71) Applicant: ATLAS GLOBAL TECHNOLOGIES LLC, Austin, TX (US)

(72) Inventors: Dae Won Lee, Austin, TX (US); Sungho Moon, Austin, TX (US); Young Hoon Kwon, Gumi (KR); Yujin Noh, Austin, TX (US)

(73) Assignee: ATLAS GLOBAL TECHNOLOGIES LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,634

(22) Filed: Jan. 13, 2023

(65) Prior Publication Data

US 2023/0179316 A1  Jun. 8, 2023

Related U.S. Application Data

(63) Continuation of application No. 17/525,691, filed on Nov. 12, 2021, now Pat. No. 11,569,925, which is a
(Continued)

(51) Int. Cl.
*H04J 11/00* (2006.01)
*H04L 1/00* (2006.01)
(Continued)

(52) U.S. Cl.
CPC .............. *H04J 11/00* (2013.01); *H04L 1/009* (2013.01); *H04L 1/1854* (2013.01);
(Continued)

(58) Field of Classification Search
CPC ........ H04J 11/00; H04L 1/009; H04L 1/1854; H04L 1/0041; H04L 1/1819; H04L 69/324
See application file for complete search history.

(56) References Cited

U.S. PATENT DOCUMENTS 9,705,622 B2 *   7/2017   Lee .......................... H04L 1/009
10,257,006 B2    4/2019   Zhang et al.
(Continued)

FOREIGN PATENT DOCUMENTS

CN   102656822   9/2012
CN   102696181   9/2012
(Continued)

OTHER PUBLICATIONS

Extended European Search Report for EP Application No. 16762257.0, dated Oct. 16, 2018.
(Continued)

*Primary Examiner* — Mandish K Randhawa

(57) ABSTRACT

A wireless communication device in a wireless system may generate a High Efficiency Physical Layer Convergence Procedure (PLCP) Protocol Data Unit (HE PPDU) frame including (i) an Orthogonal Frequency Division Multiplexing (OFDM) symbol including padding bits and (ii) an extension having a non-zero signal strength, and transmit the HE PPDU frame. A High Efficiency signal (HE-SIG) field of the transmitted HE PPDU frame may include an indication for a duration of the extension to avoid ambiguity of the extension. A communication device in a wireless system may receive an HE PPDU frame including (i) an OFDM symbol including padding bits, and (ii) an extension having a non-zero signal strength, and transmit an Acknowledgement frame a predetermined inter-frame space after an end of the HE PPDU frame. An HE-SIG field of the received HE
(Continued)

PPDU may include an indication for duration of the extension to avoid ambiguity of the extension.

15 Claims, 6 Drawing Sheets

Related U.S. Application Data continuation of application No. 16/894,531, filed on Jun. 5, 2020, now abandoned, which is a continuation of application No. 15/612,170, filed on Jun. 2, 2017, now Pat. No. 10,715,267, which is a continuation of application No. 15/061,897, filed on Mar. 4, 2016, now Pat. No. 9,705,622.

(60) Provisional application No. 62/129,717, filed on Mar. 6, 2015.

(51) Int. Cl.
*H04L 1/1829* (2023.01)
*H04L 1/1812* (2023.01)
*H04L 69/324* (2022.01)

(52) U.S. Cl.
CPC .......... *H04L 1/0041* (2013.01); *H04L 1/1819* (2013.01); *H04L 69/324* (2013.01)

(56) References Cited

U.S. PATENT DOCUMENTS

| | | | |
|---|---|---|---|
| 10,405,338 B2 | 9/2019 | Chun et al. | |
| 10,567,127 B2 | 2/2020 | Sun et al. | |
| 10,715,267 B2* | 7/2020 | Lee | H04L 1/009 |
| 11,569,925 B2* | 1/2023 | Lee | H04L 1/009 |
| 2002/0118771 A1 | 8/2002 | Larsson | |
| 2005/0195750 A1 | 9/2005 | Le et al. | |
| 2006/0262811 A1 | 11/2006 | Jiang | |
| 2011/0134900 A1* | 6/2011 | Liu | H04L 5/0032 |
| | | | 370/392 |
| 2011/0188518 A1 | 8/2011 | Kenney et al. | |
| 2011/0205983 A1 | 8/2011 | Bharadwaj et al. | |
| 2012/0195302 A1 | 8/2012 | Park et al. | |
| 2013/0294347 A1 | 11/2013 | Das et al. | |
| 2013/0315321 A1 | 11/2013 | Rajagopal et al. | |
| 2014/0254450 A1 | 9/2014 | Wentink et al. | |
| 2015/0036673 A1* | 2/2015 | Asterjadhi | H04W 28/065 |
| | | | 370/338 |
| 2016/0227437 A1* | 8/2016 | Blanksby | H04L 1/00 |
| 2017/0181187 A1* | 6/2017 | Asterjadhi | H04W 74/006 |

FOREIGN PATENT DOCUMENTS

| | | |
|---|---|---|
| EP | 2515452 | 10/2012 |
| WO | WO2005122517 | 12/2005 |
| WO | WO2015016684 | 2/2015 |

OTHER PUBLICATIONS

International Search Report and Written Opinion for International Patent Application No. PCT/US2016/021049 dated May 17, 2016.
OFDM Burst Info (802.11n/ac), Apr. 21, 2016, Keysight Technologies, Inc., URL: http://rfmw.em.keysight.com/wireless/helpfiles/89600b/webhelp/Subsystems/wlan-mimo/content/trc_ofdm_burst_info.htm.
Part 11: Wireless LAN Medium Access Control (MAC) and Physical Layer (PHY) Specifications, Amendment 2: Sub 1 GHz License Exempt Operation, IEEE P802.11ah?/D5.0, Mar. 2015, pp. 1-604, IEEE (The Institute of Electrical and Electronic Engineers, Inc.), New York, NY, USA.
Part 11: Wireless LAN Medium Access Control (MAC) and Physical Layer (PHY) Specifications, Amendment 4: Enhancements for Very High Throughput for Operation in Bands below 6 Ghz, IEEE Standards 802.11ac?-2013, 2013, pp. 1-395, IEEE (The Institute of Electrical and Electronic Engineers, Inc.), New York, NY, USA.
Part 11: Wireless LAN Medium Access Control (MAC) and Physical Layer (PHY) Specifications, IEEE Standards 802.11?-2012 (Revision of IEEE Standard 802.11-2007), Mar. 29, 2012, pp. 1-2695, IEEE (The Institute of Electrical and Electronic Engineers, Inc.), New York, NY, USA.

* cited by examiner

SUPPORT FOR ADDITIONAL DECODING PROCESSING TIME IN WIRELESS LAN SYSTEMS

CROSS-REFERENCE TO RELATED APPLICATION

This application is a continuation of U.S. patent application Ser. No. 17/525,691, filed on Nov. 12, 2021, now U.S. Pat. No. 11,569,925, issued Jan. 31, 2023, which is a continuation of U.S. patent application Ser. No. 16/894,531, filed on Jun. 5, 2020, which is a continuation of U.S. patent application Ser. No. 15/612,170, filed on Jun. 2, 2017, now U.S. Pat. No. 10,715,267, issued Jul. 14, 2020, which is a continuation of U.S. patent application Ser. No. 15/061,897, filed on Mar. 4, 2016, now U.S. Pat. No. 9,705,622, issue on Jul. 11, 2017, which claims the benefit of U.S. Provisional Application No. 62/129,717, filed on Mar. 6, 2015, the contents of which are incorporated herein by reference.

BACKGROUND

1. Technical Field

The technology described herein relates generally to wireless networking. More particularly, the technology relates to providing additional decoding time for symbols that have been transmitted over a wireless network.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE Std 802.11). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac).

Recently, an amendment focused on providing a high efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements will be made to support environments such as wireless corporate offices, outdoor hotspots, dense residential apartments, and stadiums.

Included in the focus of the 802.11ax amendment is power-efficient operation of battery-power WLAN devices. Such battery-powered devices may have substantially less processing power than typical line-powered devices.

A frame transmitted in next-generation WLAN technology, such as 802.11ax, may be transmitted using a symbol having a longer duration than symbols used in current WLAN technology such as IEEE 802.11ac. For example, a symbol in an IEEE 802.11ac WLAN may have a symbol duration of 3.2 microseconds (p), whereas a symbol in an IEEE 802.11ax WLAN may have a symbol duration of 12.8 µs. The symbol in IEEE 802.11ax WLAN may also be transmitted using more subcarriers than the symbol in the IEEE 802.11ac WLAN.

The amount of information encoded into a symbol may be proportional to the duration of the symbol and to the number of subcarriers used to transmit the symbol. Accordingly, a symbol having a duration of 12.8 µs may include four times the information of a symbol having a duration of 3.2 µs. Because the amount of processing time needed to decode a symbol may increase as the amount of information included in the symbol increases, a symbol having a duration of 12.8 µs may take longer to decode than a symbol having a duration of 3.2 µs.

The decoding of a symbol may not begin until the entire symbol has been received.

Space-Time Block Coding (STBC) may also be employed when transmitting information over the WLAN. In STBC, first and second received versions of a symbol may be combined to decode the symbol. The first version may correspond to an encoding of data, and the second version may correspond to an encoding of a complex conjugate of the data.

The first and second received versions of the symbol may be received consecutively. The decoding of a symbol transmitted using STBC may not begin until after the entirety of both versions of the symbol has been received.

A receiving device that receives a frame over the WLAN may be required to transmit a response, such as an Acknowledgement (ACK) frame, within a predetermined time after the end of the received frame. The receiving device may be required to completely decode the received frame before transmitting the response.

When a symbol duration of received frames is increased, STBC is used to encode the received frame, or both, the amount of processing required to decode the final symbol(s) of the received frame may increase. As a result, it may not be possible for some receiving devices, such as battery-powered receiving devices, to complete decoding of the final symbols(s) of the received frame in the time allowed by current WLAN technologies.

SUMMARY

In an embodiment, a method of a communication device in a wireless system comprises generating a High Efficiency Physical Layer Convergence Procedure (PLCP) Protocol Data Unit (HE PPDU) frame including (i) an Orthogonal Frequency Division Multiplexing (OFDM) symbol including padding bits and (ii) an extension having a non-zero signal strength. The method further comprises transmitting the HE PPDU frame.

In an embodiment, a High Efficiency signal (HE-SIG) field of the HE PPDU frame includes an indication for a duration of the extension to avoid ambiguity of the extension.

In an embodiment, the indication indicates whether the duration of the extension is greater than a predetermined duration.

In an embodiment, the extension supports plural durations which are a multiple of a unit of time.

In an embodiment, the unit of time is 4 microseconds.

In an embodiment, the plural durations include 0, 4, 8, 12, and 16 microseconds.

In an embodiment, the HE PPDU frame further includes a Non-HT signal (L-SIG) field indicating an end of the extension.

In an embodiment, the L-SIG field includes an L-SIG length field indicating the end of the extension.

In an embodiment, the padding bits are appended after an encoding stage encoding a MAC frame.

In an embodiment, the OFDM symbol has a symbol duration of 12.8 microsecond excluding a cyclic prefix.

In an embodiment, the OFDM symbol supports plural cyclic prefix durations of 0.8, 1.6, and 3.2 microseconds.

In an embodiment, a method of a first communication device in a wireless system comprises receiving a High Efficiency Physical Layer Convergence Procedure (PLCP) Protocol Data Unit (HE PPDU) frame including (i) an Orthogonal Frequency Division Multiplexing (OFDM) symbol including padding bits, and (ii) an extension having a non-zero signal strength, and transmitting an Acknowledgement frame a predetermined inter-frame space after an end of the HE PPDU frame.

In an embodiment, a High Efficiency signal (HE-SIG) field of the HE PPDU includes an indication for duration of the extension to avoid ambiguity of the extension.

In an embodiment, the indication indicates whether the duration of the extension is greater than a predetermined duration.

In an embodiment, the extension supports plural durations which are a multiple of a unit of time.

In an embodiment, the unit of time is 4 microseconds.

In an embodiment, the plural durations include 0, 4, 8, 12, and 16 microseconds.

In an embodiment, the HE PPDU frame further includes a Non-HT signal (L-SIG) field including a L-SIG length field indicating an end of the extension.

In an embodiment, the OFDM symbol has a symbol duration of 12.8 microsecond excluding a cyclic prefix, and supports plural cyclic prefix durations of 0.8, 1.6, and 3.2 microseconds.

In an embodiment, the predetermined inter-frame space is 16 microseconds.

In an embodiment, a method of a communication device comprises generating capability information of the communication device. The capability information indicates a required additional processing time which is to be provided by (i) first padding bits of a High Efficiency Physical Layer Convergence Procedure (PLCP) Protocol Data Unit (HE PPDU) frame and (ii) an extension of the HE PPDU frame. The method further comprises transmitting the capability information.

In an embodiment, the required additional processing time corresponds to one or more transmission types.

In an embodiment, the one or more transmission types includes a bandwidth.

In an embodiment, the one or more transmission types further includes a modulation type.

In an embodiment, a MAC frame included in the HE PPDU frame is encoded using an encoding stage, and the first padding bits are not encoded using the encoding stage.

In an embodiment, the first padding bits correspond to bits appended after the encoding stage.

In an embodiment, the encoding stage uses a Forward Error Correction (FEC) encoder.

In an embodiment, a duration of the extension is a multiple of 4 microseconds.

In an embodiment, the extension has a non-zero signal strength.

In an embodiment, the method of claim further comprises receiving the HE PPDU frame including (i) an Orthogonal Frequency Division Multiplexing (OFDM) symbol including the first padding bits, and (ii) the extension, and transmitting an Acknowledgement frame a predetermined inter-frame space after an end of the HE PPDU frame.

In an embodiment, the HE PPDU frame further includes second padding bits that are appended prior to an encoding stage.

In an embodiment, the HE PPDU frame further includes an indication indicating the first padding bits.

In an embodiment, the OFDM symbols have a symbol duration of 12.8 microsecond excluding a cyclic prefix.

In an embodiment, the OFDM symbol supports plural cyclic prefix durations of 0.8, 1.6, and 3.2 microseconds.

In an embodiment, the predetermined inter-frame space is 16 microseconds.

In an embodiment, a method of a first communication device comprises receiving capability information of a second communication device. The capability information indicates an additional processing time which is to be provided by (i) first padding bits of a High Efficiency Physical Layer Convergence Procedure (PLCP) Protocol Data Unit (HE PPDU) frame and (ii) an extension of the HE PPDU frame. The method further comprises generating the HE PPDU frame including (i) an Orthogonal Frequency Division Multiplexing (OFDM) symbol including the first padding bits and (ii) the extension, and transmitting the HE PPDU frame.

In an embodiment, the additional processing time corresponds to one or more transmission types.

In an embodiment, the one or more transmission types includes a bandwidth.

In an embodiment, the one or more transmission types further includes a modulation type.

In an embodiment, the method further comprises appending second padding bits prior to an encoding stage. The first padding bits are appended after the encoding stage.

DETAILED DESCRIPTION

Figure 1:
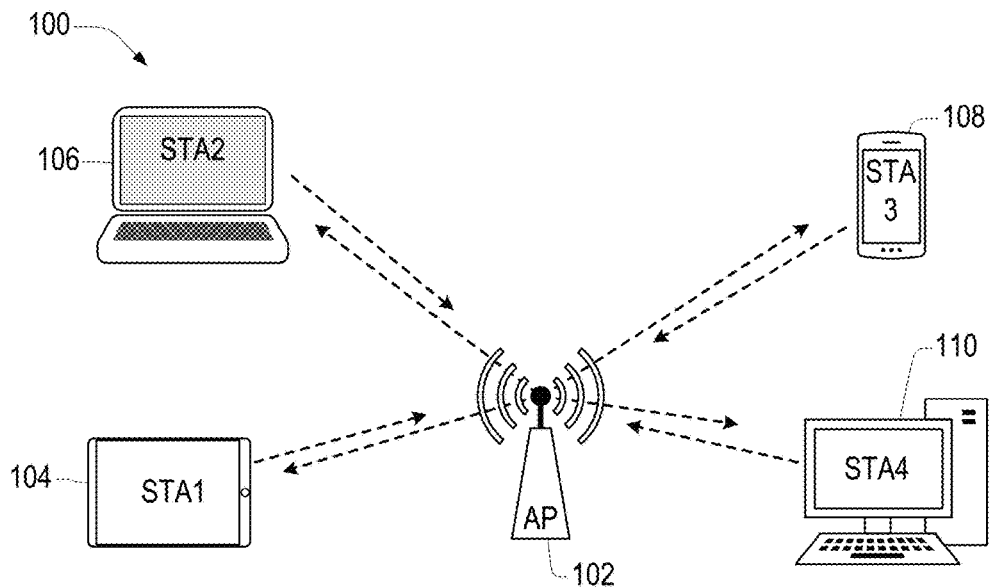
FIG. 1 illustrates a wireless network according to an embodiment.

Embodiments of the present disclosure relate generally to wireless networking, and more particularly, to increasing an available decode time (that is, an amount of time available to decode and process) of a symbol that has been received over a wireless network.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an Access Point 102 (also referred to as AP) wirelessly communicating with first, second, third, and fourth wireless devices (or stations) 104, 106, 108, and 110 (also referred to as STA1, STA2, STA3, and STA4, respectively). The wireless devices may each include a medium access control layer (MAC) and a physical layer (PHY) according to an IEEE 802.11 standard.

Although the example of FIG. 1 shows only the BSS 100 including only the first to fourth stations STA1 to STA4, embodiments are not limited thereto and may comprise BSSs including any number of STAs.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports Spatial Division Multiple Access (SDMA), two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and the transceiver may be implemented in each of the stations STA1 to STA4 and the AP 102 using respective hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may be able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

Each frame's type and subtype may be identified using a type field and a subtype field included in a control field of the frame, as prescribed in the applicable standard.

Figure 2:
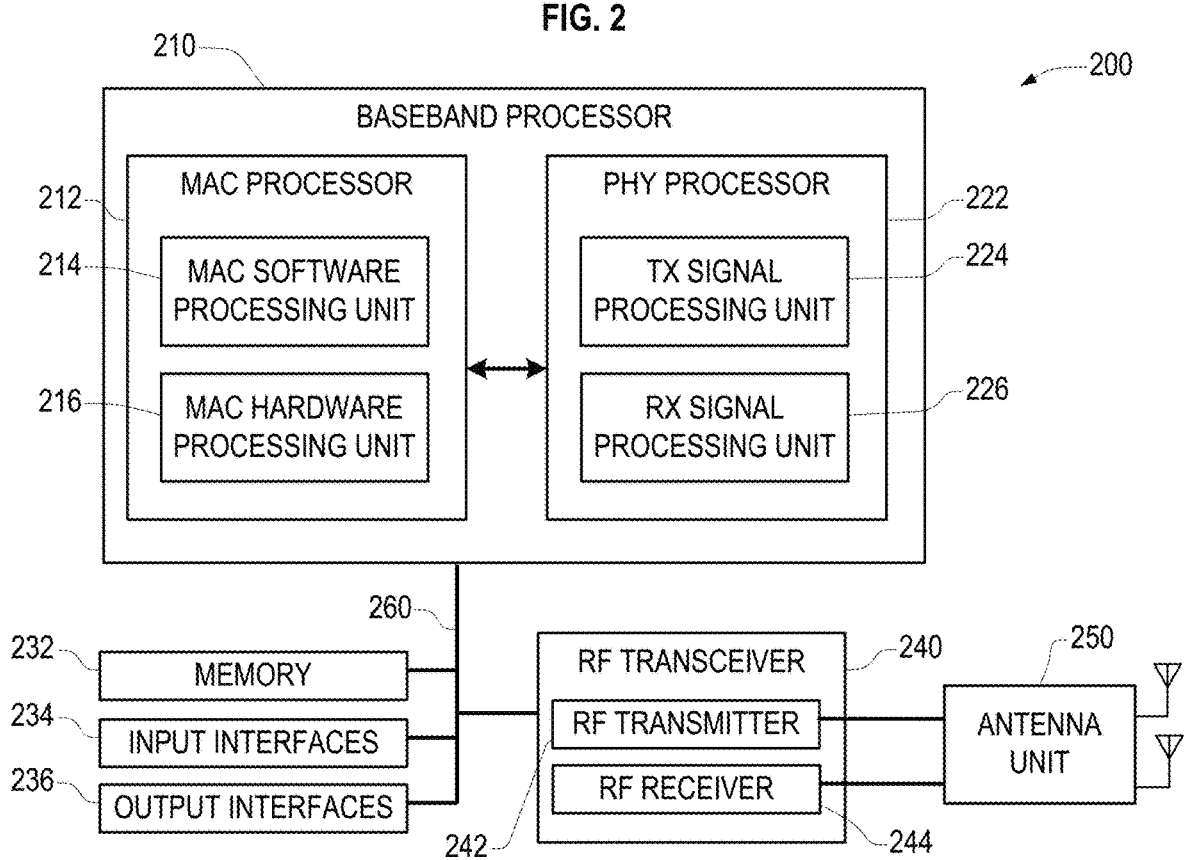
FIG. 2 is a schematic diagram of a wireless device according to an embodiment.

FIG. 2 illustrates a schematic block diagram of a wireless device 200 according to an embodiment. The wireless or WLAN device 200 can represent any device in a BSS, e.g., the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware, hereinafter referred to as "MAC hardware." However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation.

Functions performed by the transmitting signal processing unit 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
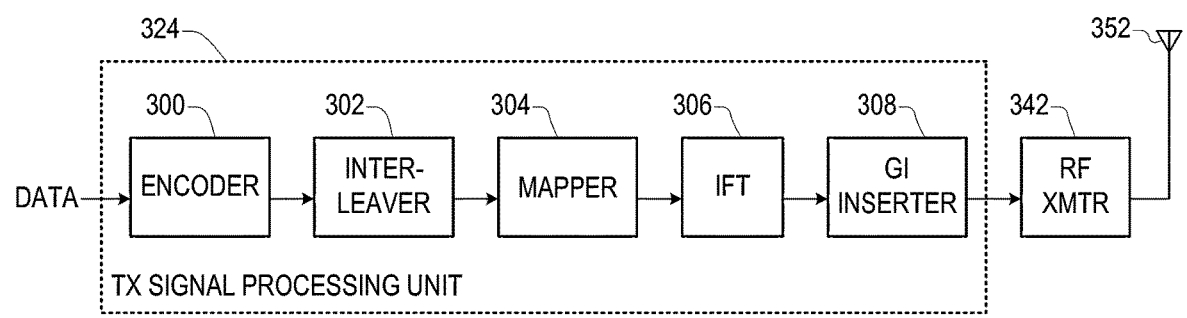
FIG. 3A illustrates components of a wireless device configured to transmit data according to an embodiment.

FIG. 3A illustrates components of a wireless device configured to transmit data according to an embodiment, including a Transmitting (Tx) Signal Processing Unit (TxSP) 324, an RF transmitter 342, and an antenna 352. In an embodiment, the TxSP 324, the RF transmitter 342, and the antenna 352 correspond to the transmitting signal processing unit 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number NSS of spatial streams of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number NSTS of space-time streams and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IIFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
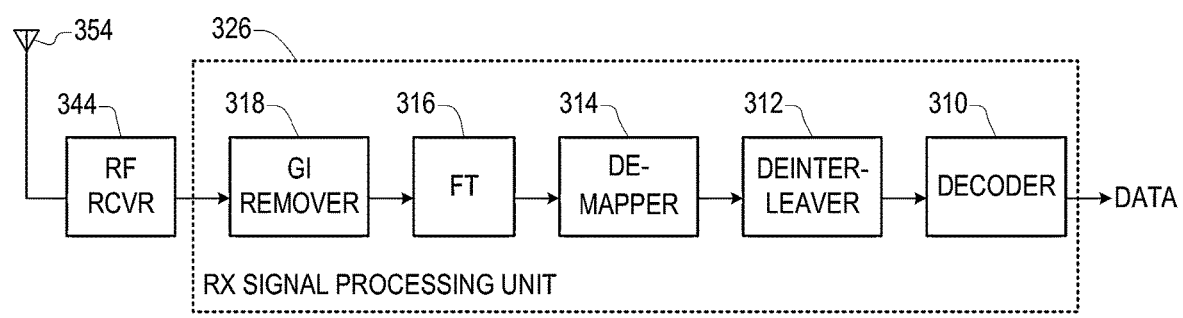
FIG. 3B illustrates components of a wireless device configured to receive data according to an embodiment.

FIG. 3B illustrates components of a wireless device configured to receive data according to an embodiment, including a Receiver (Rx) Signal Processing Unit (RxSP) 326, an RF receiver 344, and an antenna 354. In an embodiment, the RxSP 326, RF receiver 344, and antenna 354 may correspond to the receiving signal processing unit 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Figure 4A:
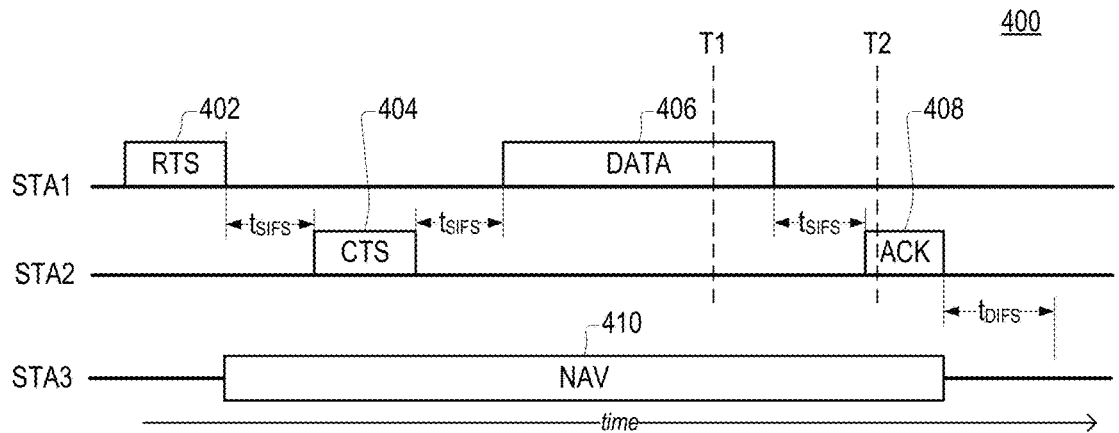
FIG. 4A illustrates a WLAN operation between a first station and a second station according to an embodiment.

FIG. 4A illustrates a WLAN operation 400 between a first station STA1 and a second station STA2 according to an embodiment. The operation includes a Ready-To-Send (RTS) frame 402, a Clear-To-Send (CTS) frame 404, a Physical Layer Convergence Procedure (PLCP) Protocol Data Unit (PPDU) frame 406, and an Acknowledgment (ACK) frame 408.

The WLAN operation 400 may utilize a Distributed Coordination Function (DCF). One or more of the stations STA1 to STA3 may be Access Points.

The first station STA1 transmits the RTS frame 402. In the example of FIG. 4A, the RTS frame 402 is addressed to the second station STA2 and not addressed to the third station STA3.

The second station STA2 receives and decodes the RTS frame 402. When the second station STA2 determines that the RTS frame 402 is addressed to the second station STA2, the second station STA2 responds to the RTS frame 402, after a first Sort Inter-Frame Space (SIFS) having a duration equal to an SFIS duration $t_{SIFS}$, by transmitting the CTS frame 404 addressed to the first station STA1. The SIFS duration $t_{SIFS}$ is measured from the end of a prior transmission in the channel to the beginning of a next transmission in the channel.

The third station STA3 also receives and decodes the RTS frame 402. When the third station STA3 determines that the RTS frame 402 is not addressed to the third station STA3, the third station STA3 sets a Network Allocation Vector (NAV) 410 according to a duration value included in the RTS frame 402. The NAV 410 is used to reserve the channel for the remainder of the WLAN operation 400.

The value set in the NAV 410 corresponds to a period of time, beginning when the NAV 410 is set, during which the third station STA3 will not transmit to the channel and, in an embodiment, may not sense the channel. The period of time may correspond to a sum of a duration of the CTS frame 404, a duration of the PPDU frame 406, a duration of the ACK frame 408, and three times the SFIS duration $t_{SIFS}$.

Depending on the geographic layout and other factors, the third station STA3 may or may not receive the CTS frame 404. When the third station STA3 receives the CTS frame 404 (not shown in FIG. 4A) and determines that the CTS frame 404 is not addressed to the third station STA3, the third station STA3 may update the NAV 410 according to a duration value included in the CTS frame 404.

After the period of time set in the NAV 410, the third station STA3 continues to not transmit for at least an additional Distributed Coordination Function (DCF) Inter-Frame Space (DIFS) having a duration equal to a DIFS duration taws. The DIFS duration $t_{DIFS}$ may be one of 28, 34, and 50 microseconds.

During the DIFS, the third station STA3 may sense the channel to determine whether the channel is in use. After the DIFS, the third station STA3 may transmit to the channel after a backoff period of 0 or more time slots.

When the first station STA1 receives and decodes the CTS frame 404, then after a second SIFS the first station STA1 transmits the PPDU frame 406. The PPDU frame 406 is addressed to the second station STA2.

The second station STA2 receives and decodes the PPDU frame 406. In response, after a third SIFS having a duration equal to the SFIS duration $t_{SIFS}$, the second station STA2 responds to the PPDU frame 406 by transmitting the ACK frame 408 addressed to the first station STA1.

If the second station STA2 fails to begin transmitting the ACK frame 408 at the end of the third SIFS, the first station STA1 may determine that transmission of the PPDU frame 406 has failed. When the first station STA1 determines that transmission of the PPDU frame 406 has failed, the first station STA1 may re-transmit the PPDU frame 406.

When the NAV 410 only reserves the channel for the WLAN operation 400 until a calculated end time of the transmission of the ACK frame 408, as shown in FIG. 4A, the second station STA2 must complete transmission of the ACK frame 408 before the period of time set in the NAV vector expires.

The second station STA2 is therefore required to start transmitting the ACK frame 408 one SIFS after the transmission of the PPDU frame 406 is complete. The second station STA2 must receive and successfully decode all valid data-carrying symbols of the PPDU frame 406 before beginning transmission of the ACK frame 408.

Figure 4B:
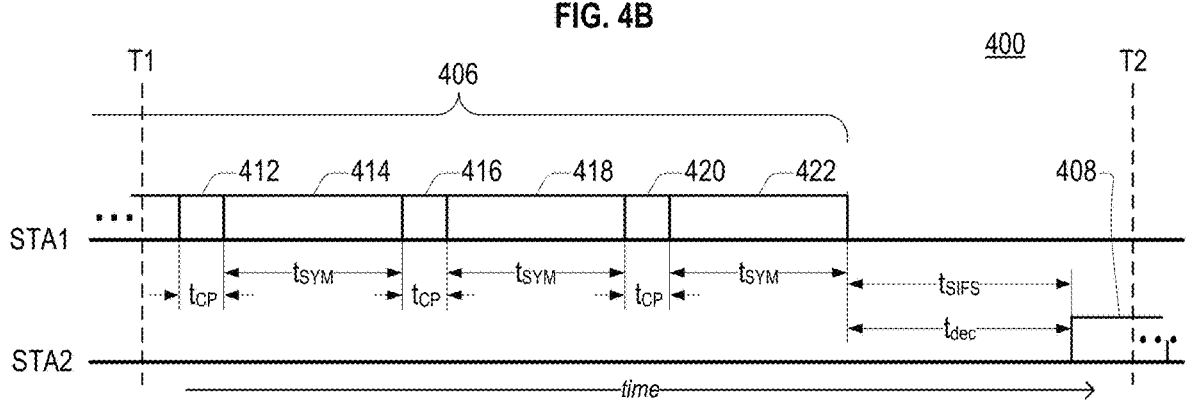
FIG. 4B illustrates details of the WLAN operation of FIG. 4A during a period between a first time T1 and a second time T2.

FIG. 4B illustrates details of the WLAN operation 400 of FIG. 4A during a period between a first time T1 and a second time T2. FIG. 4B illustrates a final portion of the PPDU frame 406 and an initial portion of the ACK frame 408.

The PPDU frame 406 includes a sequence of data symbols including a third-to-last symbol 414, a second-to-last symbol 418, and a last symbol 422. In an embodiment, the symbols 414, 418, and 422 are OFDM symbols.

Each symbol is preceded by a Cyclic Prefix (CP) that occupies a Guard Interval (GI): the third-to-last symbol 414 is preceded by a third-to-last CP 412, the second-to-last symbol 418 is preceded by a second-to-last CP 416, and the last symbol 422 is preceded by a last CP 420.

Each data symbol in the PPDU frame 406 has a duration equal to a symbol duration $t_{SYM}$. In an embodiment, the symbol duration $t_{SYM}$ is 12.8 microseconds. Each data symbol has 78.125 kHz subcarrier spacing. Each CP in the PPDU frame 406 has a duration equal to a CP duration $t_{CP}$. In an embodiment, the CP duration $t_{CP}$ may be one of 0.8, 1.6, and 3.2 microseconds.

As explained with reference to FIG. 4A, the second station STA2 may be required to finish decoding and determining the validity of the PPDU frame 406 before the end of an SIFS of 16 microseconds, the SIFS beginning when transmission of the PPDU frame 406 is complete. In an embodiment according to the IEEE 802.11b standard for a 2.4 GHz band, the second station STA2 may be required to finish decoding and determining validity of the PPDU frame 406 during a SIFS of 10 microseconds plus a Signal Extension time of 16 microseconds. Hereinafter, both the SIFS of 16 microseconds and the IEEE 802.11b SIFS+Signal Extension of 16 microseconds are referred to as the 16-microsecond SIFS.

Hereinafter, the interval between a time when a receiving device finishes receiving a final symbol that must be decoded and a time when the receiving device must begin transmitting a corresponding acknowledgment is referred to as an available decode time $t_{dec}$.

When the second station STA2 uses a pipelined implementation capable of processing one or more prior-received symbols while receiving a later symbol, the last or last few OFDM symbol(s) of the received PPDU frame 406 may be the most problematic. A time necessary to complete processing of the last or last few OFDM symbol(s) of the received PPDU frame 406 may determine the earliest time at which the second station STA2 may be ready to transmit the ACK frame 408.

Processing of the last symbol 422 may begin when the entirety of the last symbol 422 has been received. As a result, within the 16-microsecond SIFS, the second station STA2 may be required to process the last symbol 422 by performing, for example, frequency offset compensation, FFT, equalization, de-interleaving, de-rate-matching, decoding, frame checksum computation, and additional operations as described with reference to FIG. 3.

When processing the last symbol 422 does not rely on combining the last symbol 422 with any other symbol, such as when STBC is not used to transmit the last symbol 422, the earliest time which the second station STA2 may be ready to transmit the ACK frame 408 may depend on the time necessary to process the information in the last symbol 422.

An increases in the amount of information in the last symbol 422 (such as when the duration of the last symbol 422, the number of carriers used to transmit the last symbol 422, or both are increased) may increase the time necessary to process the information in the last symbol 422. For example, a symbol transmitted according to the 802.11ax amendment that has a duration of 12.8 microseconds may require processing equivalent to processing four symbols transmitted according to the IEEE Std 802.11ac that each have a duration of 3.2 microseconds. This increase in the required processing may cause a corresponding delay in the earliest time at which the second station STA2 may be ready to transmit the ACK frame 408.

When processing the last symbol 422 does rely on combining the last symbol 422 with another symbol, the time necessary to process the information in the last symbol 422 may increase.

For example, when STBC is used to transmit the PPDU frame 406, decoding the last symbol 422 may use information from both the last symbol 422 and the next to last symbol 418, and the time necessary to process the information in the combined information may be substantially longer (e.g., twice as long) than the time necessary to process the information in the last symbol 422 alone. More specifically, a pair of symbols according to the 802.11ax amendment that are transmitted utilizing STBC and that each have a duration of 12.8 microseconds may together require processing equivalent to processing eight 3.2 microseconds IEEE Std 802.11ac symbols transmitted without STBC.

Because the processing of the next to last symbol 418 and the last symbol 422 may not start before the entirety of the last symbol 422 has been received, this increase in the required processing may cause further delay in the earliest time at which the second station STA2 may be ready to transmit the ACK frame 408.

To meet the requirement to timely transmit the ACK frame 408 in situations where additional processing is required after reception of the last symbol 422, a receiving device may be supplied with more circuits to perform the processing, faster circuits to perform the processing, or both. However, in devices that are battery-powered, cost-sensitive, or both, providing more circuits, faster circuits, or both may be undesirable.

Accordingly, embodiments of the present disclosure relate to providing more time for receiving devices (such as the second station STA2) to perform the processing of one or more final decoded symbols of a frame such as the PPDU frame 406.

FIGS. 5-8 each illustrate a technology for increasing an available decode time $t_{dec}$ of a symbol according to embodiments. Each of the technologies illustrated in FIGS. 5-8 may be use alone or in combination with one or more of the other technologies.

Figure 5:
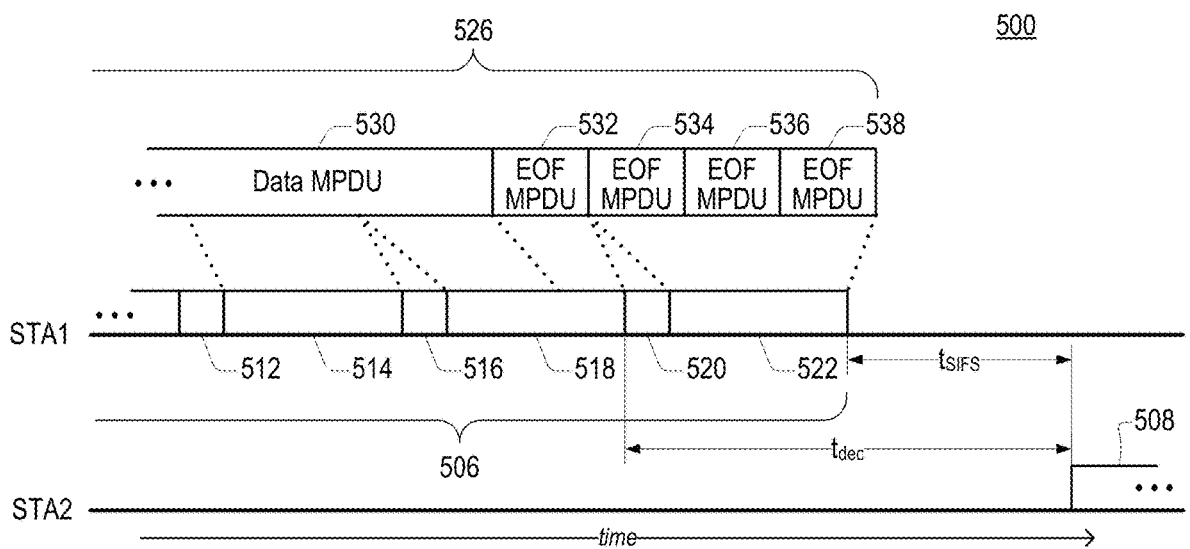
FIG. 5 illustrates a technology for increasing an available decode time of a symbol according to an embodiment.

FIG. 5 illustrates a portion of a WLAN operation 500 during a period corresponding to reception of a final portion of a PPDU frame 506 and the beginning of transmission of an ACK frame 508 responsive to the PPDU frame 506, according to an embodiment. In the WLAN operation 500, a first station STA1 transmits the PPDU frame 506 and a second station STA2 receives the PPDU frame 506. The WLAN operation 500 may be performed when the first station STA1 has determined that the second station STA2 needs additional processing time to process the final symbol containing data of the PPDU frame 506.

FIG. 5 also illustrates a final portion of an Aggregate MAC Protocol Data Unit (A-MPDU) 526 corresponding to the PPDU frame 506. The A-MPDU 526 includes a Data MPDU 530, a first End-of-Frame (EOF) MPDU 532, a second EOF MPDU 534, a third EOF MPDU 536, and a fourth EOF MPDU 538.

A second to last portion of the Data MPDU 530 is encoded into a third to last symbol 514 of the PPDU frame 506, as indicated by the dashed lines in FIG. 5. A last portion of the Data MPDU 530 and the first EOF MPDU 532 are both encoded into a second to last symbol 518 of the PPDU frame 506. The second EOF MPDU 534, third EOF MPDU 536, and fourth EOF MPDU 538 are encoded into a last symbol 522 of the PPDU frame 506. The symbols 514, 518, and 522 may each be OFDM symbols.

Although FIG. 5 shows three EOF MPDUs being encoded into a single symbol, embodiments are not limited thereto. And although FIG. 5 shows the entirety of each EOF MPDU being encoded into a single symbol, embodiments are not limited thereto, and in an embodiment a first portion of an EOF MPDU may be encoded into a first symbol and a second portion of the EOF MPDU may be encoded into a next symbol transmitted immediately after the first symbol.

Each symbol of the PPDU frame 506 is preceded by a Cyclic Prefix (CP) that occupies a Guard Interval (GI), so that the third-to-last symbol 514 is preceded by a third-to-last CP 512, the second-to-last symbol 518 is preceded by a second-to-last CP 516, and the last symbol 522 is preceded by a last CP 520.

Each of the EOF MPDUs 532, 534, 536, and 538 include a respective EOF indication. In an illustrative embodiment, each of the EOF MPDUs 532, 534, 536, and 538 may be a Null subframe, each Null subframe including an MPDU delimiter with an EOF field set to 1. The EOF field being set to 1 indicates to a receiving device that all of the non-Null MPDUs in the A-MPDU 526 have been received.

When the second station STA2 decodes the second to last symbol 518 of the PPDU frame 506, the second station STA2 may the extract the final portion of the Data MPDU 530 and the first EOF MPDU 532 from the second to last symbol 518. When the first EOF MPDU 532 includes an EOF indication, such as an MPDU delimiter with an EOF field set to 1, the second station STA2 may determine that the last symbol 538 does not need to be decoded.

As a result, the available decode time $t_{dec}$ for the second station STA2 to decode the final symbol of the PPDU frame 506 that is to be decoded (i.e., the last symbol with data, which in this example is second to last symbol 518) is increased. In the example shown in FIG. 5, the available decode time twee increases to a sum of the SIFS duration $t_{SIFS}$, a symbol duration $t_{SYM}$, and a CP duration $t_{CP}$.

For example, when the SIFS duration $t_{SIFS}$ is 16 microseconds, the symbol duration $t_{SYM}$ is 12.8 microseconds, and the CP duration $t_{CP}$, the available decode time $t_{dec}$ increases from 16 microseconds to 32 microseconds. However, embodiments are not limited thereto, and the final symbol of the PPDU frame 506 that is to be decoded may correspond to a symbol prior to the second to the last symbol 518 by the addition of additional symbols including EOF MPDUs to the end of the A-MPDU 526.

Thus, as shown in FIG. 5, in order to provide more time for the receiver (second station STA2), the transmitter (the first station STA1) can, at the MAC layer, pad one or more extra data units (such as MPDUs) that do not need to be decoded at the receiver. Because bits in the MAC layer are encoded by an encoding stage (such as a FEC stage), MAC padding occurs prior to the encoding stage, so the MAC padding can be called pre-encoding padding or pre-FEC padding. In an embodiment, the extra data units may be one or more EOF MPDU in an A-MPDU transmission. The receiver may determine that one or more OFDM symbols do not need decoding by detecting an EOF MPDU in an OFDM symbol received prior to the one or more OFDM symbols that do not need decoding.

In an embodiment, when an A-MPDU is transmitted using STBC, the number of OFDM symbols used to transmit data in the A-MPDU is a multiple of two. However, when the last symbol used to transmit the A-MPDU contains only padding that does not need decoding by the receiver, the last symbol used to transmit the A-MPDU may be a single OFDM symbol that is not paired with another OFDM symbol.

A device receiving a frame that detects an EOF MPDU in the frame may determine to not decode any OFDM symbols that follow an OFDM symbol that included the EOF MPDU.

In an embodiment, the receiving device may detect the EOF MPDU after reception of the entire EOF MPDU, including frame check sum (FCS) bits associated with the EOF MPDU. When transmitting to the receiving device of this embodiment, a device transmitting the frame including the EOF MPDU may pad the transmitted information so that a first EOF MPDU in the frame is transmitted in its entirety before the beginning of the OFDM symbol or symbols that do not need decoding. That is, the first EOF MPDU is transmitted in its entirety before the beginning of the last OFDM symbol or, when the receiving device needs more than one symbol duration $t_{SYM}$ of decoding processing time relaxation, before a plurality of final OFDM symbols.

In another embodiment, the receiving device may detect the EOF MPDU when the header of the EOF MPDU is decoded, even when a final portion of the EOF MPDU was transmitted in an OFDM symbol that has not been decoded. When transmitting to the receiving device of this embodiment, a device transmitting the frame including the EOF MPDU may pad the transmitted information so that a header portion of a first EOF MPDU in the frame is transmitted in its entirety before the beginning of the OFDM symbol or symbols that do not need decoding. That is, the header of the first EOF MPDU is transmitted in its entirety before the beginning of the last OFDM symbol or, when the receiving device needs more than one symbol duration $t_{SYM}$ of decoding processing time relaxation, before a plurality of final OFDM symbols.

Figure 6:
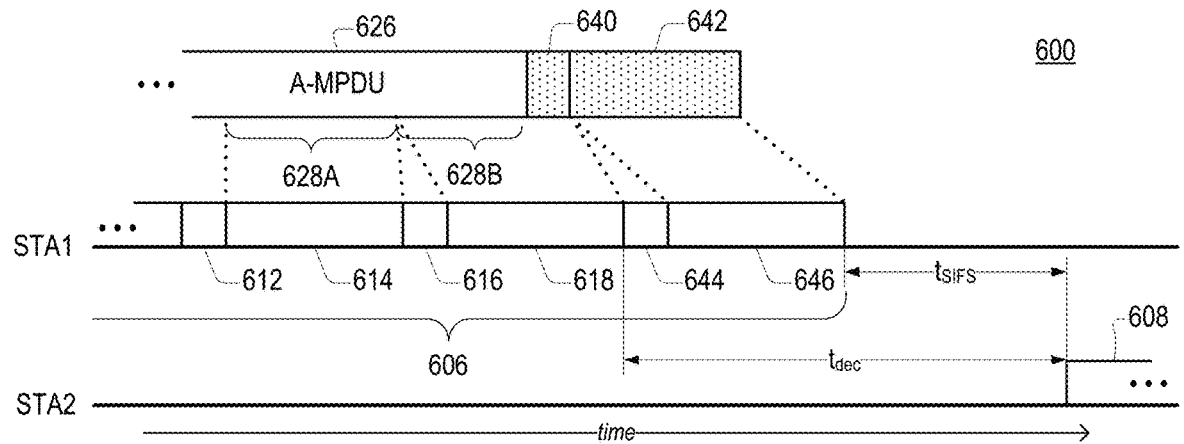
FIG. 6 illustrates a technology for increasing an available decode time of a symbol according to another embodiment.

FIG. 6 illustrates a portion of a WLAN operation 600 during a period corresponding to reception of a final portion of a PPDU frame 606 and a beginning of transmission of an ACK frame 608 responsive to the PPDU frame 606, according to another embodiment. The WLAN operation 600 includes the PPDU frame 606 transmitted by a first station STA1 and the corresponding ACK frame 608 transmitted by a second station STA2.

FIG. 6 also includes first extra PHY padding bits including first and second padding bits 640 and 642 which the first station STA1 incorporates into the PPDU 606 in the physical layer. The first extra PHY padding bits can occur prior to encoding stage, and it is encoded by the encoding stage, so the first extra PHY padding bits can be called pre-encoding PHY padding bits. Because the FEC is used for the encoding stage, the pre-encoding PHY padding bits can be called pre-FEC PHY padding bits. The pre-FEC MAC padding bits and the pre-FEC PHY padding bits may be applied before the encoding stage using the FEC encoder.

The PPDU frame 606 includes a sequence of symbols including a third-to-last symbol 612, a second-to-last symbol 618, and a last symbol 646. Each symbol is preceded by a Cyclic Prefix (CP) that occupies a Guard Interval (GI): the third-to-last symbol 614 is preceded by a third-to-last CP 612, the second-to-last symbol 618 is preceded by a second-to-last CP 616, and the last symbol 646 is preceded by a last CP 644. In an embodiment, the symbols 614, 618, and 646 are OFDM symbols.

Also illustrated in FIG. 6 is an A-MPDU 626 corresponding to the PPDU frame 606. A second to last portion 628A of the A-MPDU 626 is encoded into the third to last symbol 614 of the PPDU frame 606.

A last portion 628B of the A-MPDU 626 is encoded into the second to last symbol 618 of the PPDU frame 606. First padding bits 640 are also encoded into the second to last symbol 618. In an embodiment, the first padding bits 640 are added before an encoding process (such as an FEC encoding) of the last portion 628B of the A-MPDU 626, and the first padding bits 640 are joint encoded with the information in the last portion 628B.

Second padding bits 642 are encoded into the last symbol 646. The second padding bits 642 are added before the encoding process (such as the FEC encoding) of the last portion 628B of the A-MPDU 626, and (like the first padding bits 640) are jointly encoded with the information in the last portion 628B.

FIG. 6 shows the first padding bits 640 encoded into second to last symbol 618 with information corresponding to a portion of the A-MPDU 626 and the second padding bits 642 encoded into the last symbol 646, but embodiments are not limited thereto. In an embodiment, symbols produced using the first padding bits 640 do not include information corresponding to a portion of the A-MPDU 626. In an embodiment, the second padding bits 642 are used to produce a plurality of final symbols of the PPDU 606.

Figure 7:
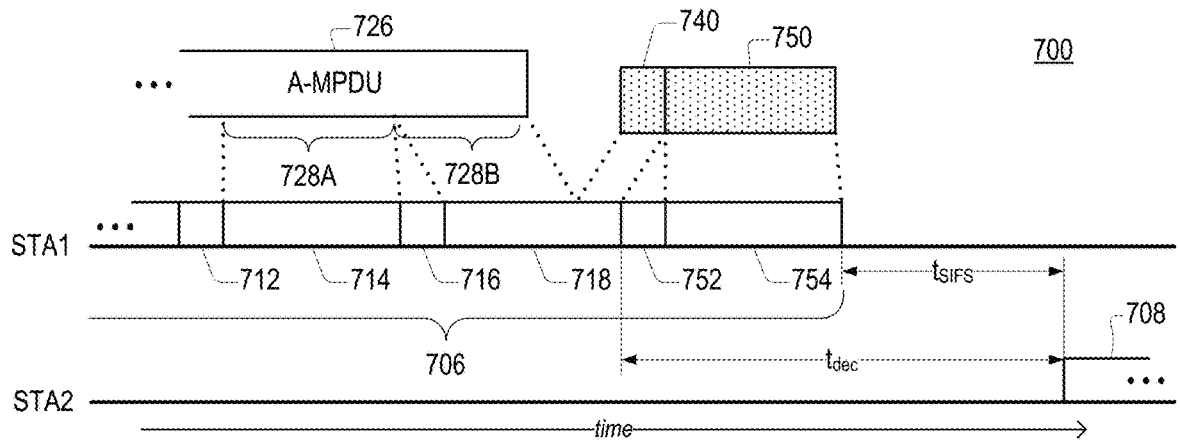
FIG. 7 illustrates a technology for increasing an available decode time of a symbol according to another embodiment.

FIG. 7 illustrates a portion of a WLAN operation 700 during a period corresponding to a reception of a final portion of a PPDU frame 706 and a beginning of a transmission of an ACK frame 708 responsive to the PPDU frame 706, according to another embodiment. The WLAN operation 700 includes the PPDU frame 706 transmitted by a first station STA1 and the corresponding ACK frame 708 transmitted by a second station STA2.

FIG. 7 also includes second extra PHY padding bits including first and second padding bits 740 and 750 which the first station STA1 incorporates into the PPDU 706 in a physical (PHY) layer. The second extra PHY padding bits can be provided as separately encoded bits from the frame from the MAC layer like the A-MPDU, while the first extra PHY padding bits occurs prior to encoding stage. The second extra PHY padding bits are separate from the A-MPDU and the first extra PHY padding bits in terms of the encoding stage which joint encodes the MAC frame and the first extra PHY padding bits. The second extra PHY padding bits occur after the encoding stage encoding the MAC frame and the first extra PHY padding bits, and therefore may be referred to as post-encoding PHY padding bits. Because the FEC is used for the encoding stage, the post-encoding PHY padding bits can be called post-FEC PHY padding bits. The post-FEC PHY padding bits may be applied on FEC encoded bits.

The PPDU frame 706 includes a sequence of symbols including a third-to-last symbol 712, a second-to-last symbol 718, and a last symbol 754. Each symbol is preceded by a Cyclic Prefix (CP) that occupies a GI: the third-to-last symbol 714 is preceded by a third-to-last CP 712, the second-to-last symbol 718 is preceded by a second-to-last CP 716, and the last symbol 754 is preceded by a last CP 752. In an embodiment, the symbols 714, 718, and 754 are OFDM symbols.

Also illustrated in FIG. 7 is an A-MPDU 726 corresponding to the PPDU frame 706. A second to last portion 728A of the A-MPDU 726 is encoded into the third to last symbol 714 of the PPDU frame 706.

A last portion 728B of the A-MPDU 726 is encoded into the second to last symbol 718 of the PPDU frame 706. First padding bits 740 are also added into the second to last symbol 718. The first padding bits 740 are added after an encoding process (such as an FEC encoding) of the last portion 728B of the A-MPDU 726, and the first padding bits 740 are not joint encoded with information in the last portion 728B.

Second padding bits 750 are added into the last symbol 754. The second padding bits 750 are added after the encoding process (such as the FEC encoding) of the last portion 728B of the A-MPDU 726, and are not jointly encoded with the information in the last portion 728B. Because the second padding bits 750 are not jointly encoded with information of the A-MPDU 726, decoding of the A-MPDU 726 may be completely separate from decoding of the second padding bits 750, and an amount of time available to decode the A-MPDU 726 may be increased. In particular, an available decode time $t_{dec}$ for decoding the second to last symbol 718 may be increased.

FIG. 7 shows the second padding bits 750 are added into the last symbol 754, but embodiments are not limited thereto. In an embodiment, the second padding bits 750 are added into a plurality of final symbols of the PPDU 706.

In an embodiment, the first station STA1 may provide the second station STA2 with an indication indicating the presence or the amount of the second extra padding bits. In an embodiment, the first station STA1 may provide an indication to the second station STA2 that the PPDU 706 includes additional symbols (such as the last symbol 755) that were added in the physical layer and that correspond to the second padding bits 750.

In an embodiment, the presence in the PPDU 706 of additional symbols (such as the last symbol 755) that were added in the physical layer and that correspond to second padding bits 750 is prescribed by a standard, such as, for example, the proposed IEEE Std 802.11ax standard.

In an embodiment, because the second station STA2 does not need to perform decoding of the second padding bits 750, the first station STA1 may not completely send the last symbol 754, and may instead only transmit part of the last symbol 754. In an embodiment, the second padding bits 750, the last symbol 754, and the last CP 752 may be omitted, and the last symbol of the PPDU 706 may include a portion of A-MPDU 726 and the first padding bits 740.

Figure 8:
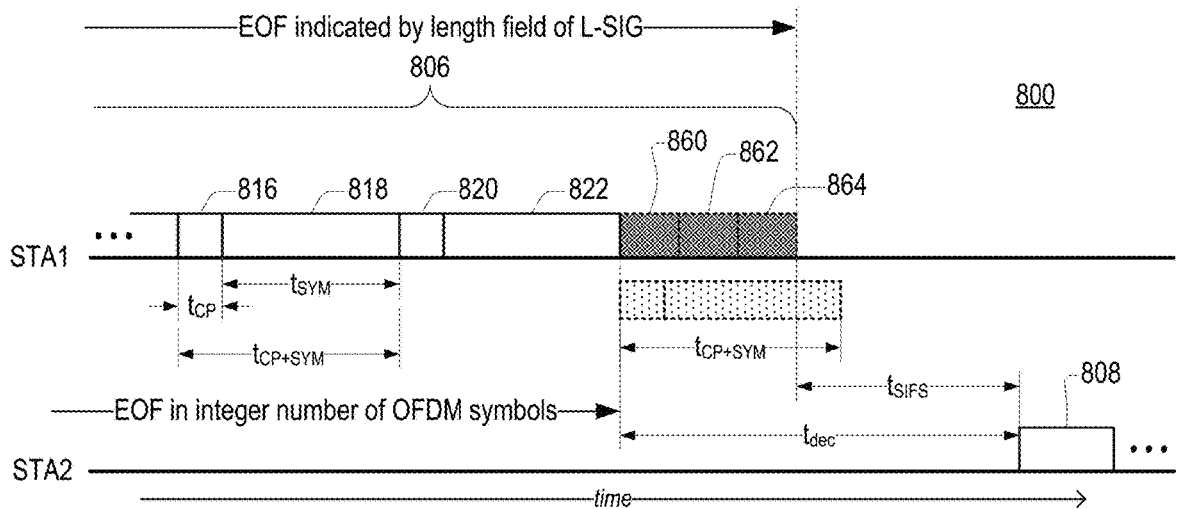
FIG. 8 illustrates a technology for increasing an available decode time of a symbol according to another embodiment.

FIG. 8 illustrates a WLAN operation 800 during a period corresponding to reception of a final portion of a PPDU frame 806 and the beginning of transmission of an ACK frame 808 responsive to the PPDU frame 806, according to another embodiment. The WLAN operation 800 includes the PPDU frame 806 transmitted by a first station STA1 and the corresponding ACK frame 808 transmitted by a second station STA2.

The PPDU frame 806 includes a sequence of symbols including a second-to-last symbol 818 and a last symbol 822. Each symbol is preceded by a Cyclic Prefix (CP) that occupies a GI: the second-to-last symbol 818 is preceded by a second-to-last CP 816, and the last symbol 822 is preceded by a last CP 820.

In an embodiment, the symbols 818 and 822 are OFDM symbols.

In an embodiment, symbol durations $T_{SYM}$ of the symbols 818 and 822 are each equal to 12.8 microseconds. In an embodiment, CP durations $T_{CP}$ of the CPs 816 and 820 are each equal to any one of 0.8, 1.6, and 3.2 microseconds.

A duration to the End of Frame (EOF) of the PPDU 806 is indicated by a Legacy Signal (L-SIG) field (not shown) of the PPDU 806. The L-SIG field includes a data rate field in bits per 1 second and a length field in bytes, wherein both the data rate field and the length field indicates the number of virtual OFDM symbols in the PPDU after the L-SIG field, and each virtual OFDM symbol has a four (4) microsecond duration regardless of a duration of the actual symbols used to transmit the PPDU 806. As a result, both the data rate field and the length field can be used to derive the N×4 microsecond duration of the PPDU. The length field of the L-SIG field is a number of bytes in the PPDU 806 after the L-SIG field. For example, the duration to the EOF of the PPDU, relative to the end of the L-SIG field, may therefore be determined using by dividing the length field multiplied by 8 bits by the data rate field multiplied by 4 microseconds and multiplying the result of the division by the 4 microseconds duration of the virtual OFDM symbols.

When a duration of the symbols used to transmit a post-L-SIG-field portion of the PPDU 806 is 12.8 microseconds, the L-SIG field may be used to provide additional time to the available decode time $t_{dec}$ for the last symbol 822 by indicating a duration that does not correspond to an integer number of the symbols used to transmit the post-L-SIG-field portion of the PPDU 806. The end of the frame can be extended by using the L-SIG length indication. The L-SIG length indicated by the L-SIG field can indicate the end of the extension added to the end of the frame.

In the example shown in FIG. 8, the symbol duration $T_{SYM}$ is 12.8 microseconds and the CP duration $T_{CP}$ is 3.2 microseconds. Each pair of CP and symbol therefore has a prefixed symbol duration $t_{CP+SYM}$ of 16 microseconds, equal to the duration of four 4-microsecond virtual OFDM symbols.

In the example shown FIG. 8, the L-SIG field indicates a duration to the EOF that is longer than the duration to the end of the last symbol 822 by three 4-microsecond intervals. The three 4-microsecond intervals respectively correspond to first, second, and third virtual OFDM symbols 860, 862, and 864 of FIG. 8. The second station STA2 can unambiguously determine the actual duration of the PPDU 806 (that is, the duration to the end of the last symbol 822) by determining the largest duration, relative to the end of the L-SIG field, that is less than or equal to the duration indicated by the L-SIG field and that is a multiple of the prefixed symbol duration $t_{CP+SYM}$, which prefixed symbol duration $t_{CP+SYM}$ is 16 microseconds in the example shown.

For example, if the L-SIG field indicates a post-L-SIG-field duration to the EOF that is 172 microseconds (corresponding to 43 4-microsecond virtual OFDM symbols), the second station STA2 may unambiguously determine that the actual duration of the post-L-SIG-field portion of the PPDU 806 is 160 microseconds and the duration of the extension of the PPDU 806 is 12 microseconds, because the 160-microsecond duration corresponds to the largest whole number of prefixed symbol durations $t_{CP+SYM}$ that is less than the 172 microsecond duration indicated by the L-SIG field.

In an embodiment, the second station STA2 may not decode signals received after the actual duration of the post-L-SIG-field portion of the PPDU 806.

In an embodiment, the first station STA1 may transmit no signal or a null signal during the period of the extension corresponding to the virtual OFDM symbols 860, 862, and 864. The extension may have a zero signal strength.

In an embodiment, the first station STA1 may transmit during the period of the extension corresponding to the virtual OFDM symbols 860, 862, and 864. The extension may have a non-zero signal strength. The signals transmitted during the period corresponding to the virtual OFDM symbols 860, 862, and 864 may be adapted to ensure proper operation of Clear Channel Assessment (CCA) process of the WLAN.

In the example shown in FIG. 8, the extension is added to provide an additional 12 microseconds to the available decode time $t_{dec}$, but embodiments are not limited thereto. In an embodiment, a duration of the extension can support plural durations that are a multiple of a unit of time. The unit of time may be 4 microseconds, and in this case the plural durations may include 0, 4, 8, 12, and 16 microseconds.

In an embodiment, the duration of the extension needs to be smaller than a 12.8 us OFDM symbol length to avoid length ambiguity of the extension. For example, as described above, if the L-SIG field indicates a post-L-SIG-field duration to the EOF that is 172 microseconds (corresponding to 43 4-microsecond virtual OFDM symbols), the second station STA2 may unambiguously determine that the actual duration of the post-L-SIG-field portion of the PPDU 806 is 160 microseconds and the duration of the extension of the PPDU 806 is 12 microseconds. However, if the L-SIG field indicates a post-L-SIG-field duration to the EOF that is 176 microseconds (corresponding to 44 4-microsecond virtual OFDM symbols), the second station STA2 cannot unambiguously determine the actual duration of the post-L-SIG-field portion of the PPDU 806 and the duration of the extension of the PPDU 806, because the actual duration of the post-L-SIG-field portion of the PPDU 806 and the duration of the extension are not explicitly derived from L-SIG field. If a length indication that is not explicitly derived from the duration indicated by the L-SIG field is sent in a High Efficiency SIG (HE-SIG) field, it is possible to indicate more than 12 microseconds of additional available decode time. The HE-SIG field may include an indication for a duration of the extension to avoid length ambiguity of the extension. The length indication in the HE-SIG field may indicate whether the duration of the extension is greater than a predetermined duration. For example, the predetermined duration can be 12 microseconds, when the symbol duration $T_{SYM}$ is 12.8 microseconds and the CP duration $T_{CP}$ is 3.2 microseconds. Because a duration of the extension can be a multiple of 4 microseconds like any one of 0, 4, 8, 12, and 16 microseconds, the length indication in the HE-SIG field can indicate TRUE if the duration of the extension is 16 microseconds, and the length indication in the HE-SIG field can indicate FALSE if the duration of the extension is any one of 0, 4, 8, and 12 microseconds.

A first device receiving a first frame may require a different available decode time than a second device receiving a second frame, even when last frame(s) of the second frame require substantially identical processing to last frame(s) of the first frame. For example, the first devices may require an additional 4 us of available decode time from an end of reception of a final OFDM symbol containing data that needs to be decoded, while the second device may require an additional 12 us of available decode time from the end of reception of the final OFDM symbol containing data that needs to be decoded.

A device may also require a different amount of additional available decode time according to transmission properties of the frame (that is, a transmission format of the frame.) For example, the amount of additional available decode time required by the device may vary according to one or more of the type of a Forward Error Correction (FEC) encoding (e.g., LDPC, BCC, and the like), a Modulation and Coding Scheme (MC S), a bandwidth (BW), whether STBC is used, whether SFBC is used, a data rate, and the like. Here, the MCS indicates a combination of the modulation type (like BPSK, QPSK, 16-QAM, 64-QAM, and the like) and the coding rate (like ½, ¾, ⅔, and the like).

In an embodiment, a device may provide its capability information including an indication of whether the device is capable of performing decoding of the final symbol(s) without requiring an additional amount of available decode time according to the transmission format. For example, the device may provide one or more respective indications that a frame transmitted using STBC and LDPC, a frame transmitted using an 80 MHz BW and LDPC, and so on may be decoded without requiring additional available decoding time.

In an embodiment, a device may provide its capability information including an indication of an additional amount of available decode time required for one or more transmission formats or for all transmission formats.

In an embodiment, a device may provide its capability information including an indication of an additional amount of available decode time required according to a supported MCS Capability, such as a Receive (Rx) VHC-MCS Map, an Rx Highest Supported Data Rate, and the like.

Figure 9:
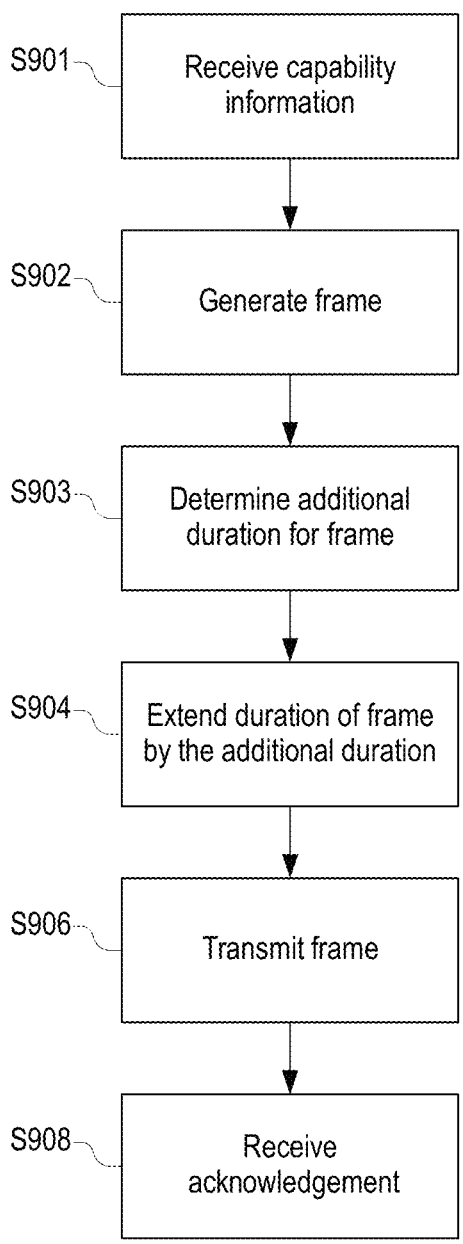
FIG. 9 illustrates a process for increasing an available decode time of a symbol encoded into a transmitted frame, according to an embodiment.

FIG. 9 illustrates a process 900 for increasing an available decode time of a symbol encoded into a transmitted frame according to an embodiment. In an embodiment, the frame is a WLAN frame, such as, for example, a frame transmitted according to an IEEE 802.11 standard. In an embodiment, the frame is a High Efficiency PLCP Protocol Data Unit frame (HE PPDU).

The process 900 may be performed by a transmitting device, such as a station of a WLAN. In an embodiment, the transmitting device performing the process 900 is an Access Point (AP). In an embodiment, the transmitting device performing the process 900 is a Non-AP station.

In an embodiment, the frame is a type of frame that requires a device receiving the frame to transmit a response within a predetermined period of time, the predetermined period of time being measured relative to the end of transmission of the frame. Before transmitting the response, the receiving device may be required to decode and process all symbols in the frame that carry information being sent to the receiving device.

In an embodiment, the predetermined period of time is a Short Inter-Frame Space (SIFS). In an embodiment, the predetermined period of time is 16 microseconds.

At S901, the transmitting device receives capability information of a receiving device from the receiving device. The capability information may include a required additional processing time for one or more transmission types. The one or more transmission types may include a modulation type, a coding rate, a bandwidth, an encoding type, whether STBC is used, and whether SFBC is used. The post-encoding PHY padding bits and the extension of the frame may provide the additional processing time. The capability information may include plural additional processing times for plural transmission formats or for all possible transmission formats. The transmission format is a combination of plural transmission type. For example, one transmission format may use a modulation type of BP SK and a bandwidth of 20 MHz, and another transmission format may use a modulation type of QPSK and a bandwidth of 40 MHz. If five (5) modulation types and four (4) bandwidths exist, the number of the all possible transmission formats can be 20 (=5×4).

At S902, the transmitting device generates a frame including an L-SIG field, an HE-SIG field, and 12.8 us long OFDM symbols with either 0.8, 1.6, or 3.2 μs cyclic prefixes (CP).

At S903, the transmitting device determines an additional duration for the frame, the additional duration being a duration beyond a duration used to transmit the information being sent to the receiving device. The additional duration may correspond to a period of time immediately after the transmission of a plurality of symbols that carry the information being sent, using the frame, to the receiving device.

In an embodiment, the transmitting device may determine the additional duration for the frame based on the capability information of the one or more receiving devices. The additional duration may be determined according to one or more transmission properties (that is, a transmission format) of the frame. The transmission property used to determine the additional duration may be one or more of a bandwidth of the frame, a Modulation and Coding Scheme (MCS) of the frame, a type of Forward Error Correction (FEC) encoding of the frame, a data rate of the frame, whether the frame is transmitted using Space Time Block Coding (STBC), whether the frame is transmitted using Space Frequency Block Coding (SFBC), and the like.

In an embodiment, the additional duration may be determined according to one or more characteristics of the receiving device. The one or more characteristics may correspond to a time required by the receiving device to decode and process one or more symbols of the frame.

For example, when neither STBC nor SFBC is used to transmit the frame, the one or more characteristics may correspond to a time required to process and decode the last symbol of the frame that include the information being sent to the receiving device. When one of STBC or SFBC is used to transmit the frame, the one or more characteristics may correspond to a time required to process and decode two of the last symbols of the frame that include the information being sent to the receiving device.

Figure 11:
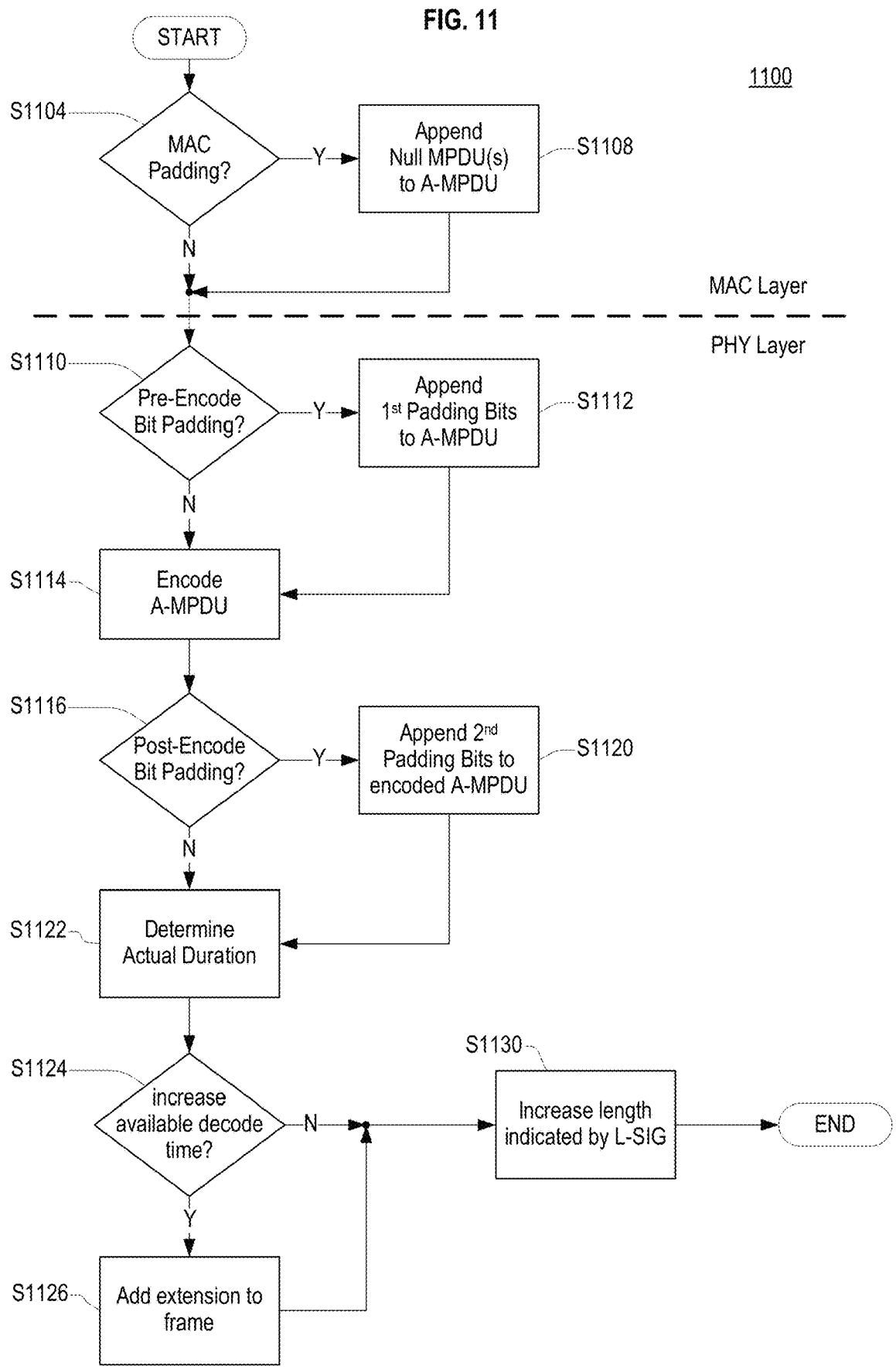
FIG. 11 illustrates a process for extending a duration of a frame according to an embodiment.

At S904, the transmitting device extends the duration of the frame according to the additional duration. An embodiment of a process for extending the duration of the frame according to the additional duration is illustrated in FIG. 11, described below.

In an embodiment, the transmitting device may perform the WLAN operation 500 of FIG. 5. The transmitting device may extend the duration of the frame by appending one or more Null MAC Protocol Data Units (MPDUs) (e.g., one or more End of Frame (EOF) MPDUs) to an Aggregate MPDU (A-MPDU) corresponding to the frame.

In an embodiment, the transmitting device may perform the WLAN operation 600 of FIG. 6. The transmitting device may extend the duration of the frame by appending padding bits to a data unit corresponding to the frame, and then performing a joint encoding of the data unit and the padding bits. In an embodiment, the data unit is an MPDU or an A-MPDU. In an embodiment, the encoding is a type of Forward Error Correction (FEC) encoding, such as a Low Density Parity Check (LDPC) encoding or a Binary Convolution Code (BCC) encoding.

In an embodiment, the transmitting device may perform the WLAN operation 700 of FIG. 7. The transmitting device may extend the duration of the frame by performing an encoding of the data unit and appending padding bits to a result of the encoding. In an embodiment, the data unit is an MPDU or an A-MPDU. In an embodiment, the encoding is a type of Forward Error Correction (FEC) encoding.

In an embodiment, the transmitting device may perform the WLAN operation 800 of FIG. 8. The transmitting device may extend the duration of the frame by indicating an extended duration in a Legacy Signal (L-SIG) field of the frame. The extended duration may be greater than the duration used to transmit the information being sent to the receiving device. In an embodiment, the duration indicated by the L-SIG field may be one of 0, 4, 8 and 12 microseconds longer than the duration used to transmit the information.

At S906, the transmitting device transmits the frame.

In an embodiment, the transmitting device transmits null symbols during the additional duration of the frame.

In an embodiment, the transmitting device transmits signals during the additional duration of the frame.

At S908, the transmitting device receives an Acknowledgement frame in response to the frame an SIFS after the end of the frame.

Figure 10:
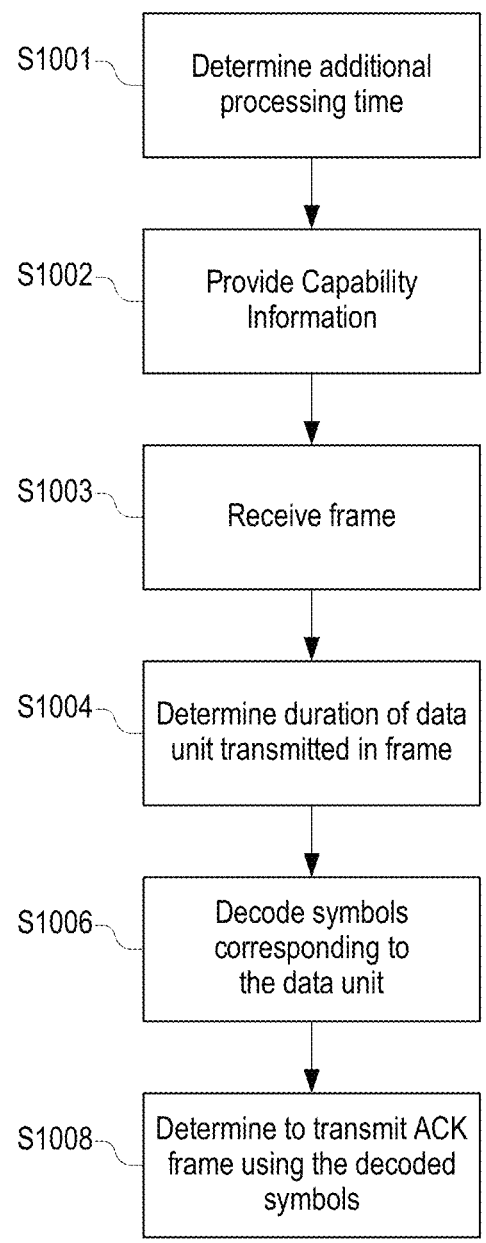
FIG. 10 illustrates a process of receiving and processing a frame having an extended duration, according to an embodiment.

FIG. 10 illustrates a process 1000 of receiving and processing a frame having an extended duration. The extended duration provides additional time to decode a symbol of the frame (that is, the extended duration increases the available decoding time for the decoding of the symbol).

The process 1000 may be performed by a receiving device, such as a station of a WLAN. In an embodiment, the WLAN is a WLAN operating according to an IEEE 802.11 standard.

At S1001, the receiving device determines a required additional processing time. The receiving device may determine the required additional processing time based on one or more transmission types. The one or more transmission types may each include one or more of a modulation type, a coding rate, a bandwidth, and an encoding scheme.

At S1002, the receiving device provides the transmitting device with capability information of the receiving device. The capability information may include a required additional processing time for one or more transmission types. The post-encoding PHY padding bits and the extension of the frame may provide the additional processing time.

At S1003, the receiving device receives a frame having an L-SIG field, an HE-SIG field, 12.8 us long OFDM symbols with either 0.8, 1.6, or 3.2 μs cyclic prefixes (CP), pre-encoding PHY padding bits, post-encoding PHY padding bits, and an extension for the frame. In an embodiment, the frame is an HE-PPDU frame.

At S1004, the receiving device determines a duration of a transmission of a data unit included in the frame. In an embodiment, the data unit is an MPDU or an A-MPDU. In an embodiment, the duration of the transmission of the data unit is relative to the end of a Legacy Signal (L-SIG) field of the frame.

In an embodiment, the receiving device determines the duration of the transmission of the data unit by detecting an EOF MPDU in the data unit.

In an embodiment, the receiving device determines the duration of the transmission of the data unit using a duration indicated in a Legacy Signal (L-SIG) field of the received frame. In an embodiment, the duration of the transmission of the data unit is relative to the end of the L-SIG field of the frame.

In an embodiment, the transmission of the data unit is performed using a plurality of symbols, wherein each symbol has a prefixed symbol duration. The prefixed symbol duration includes a duration of the symbol and a duration of a cyclic prefix associated with the symbol. In an embodiment, the prefixed symbol duration may be any one of 13.6, 14.4, and 16 microseconds.

The receiving device may determine the duration of the transmission of the data unit by determining a duration indicated by the L-SIG field, and determining the longest duration that is an integer multiple of the prefixed symbol duration and that is less than or equal to the duration indicated by the L-SIG field.

In an embodiment, the receiving device determines the duration of the transmission of the data unit using a length indication of an HE-SIG field of the received frame. The length indication indicates whether the extended duration is greater than the duration of the transmission of the data unit by a predetermined duration. In an embodiment, the predetermined duration is 12 microseconds.

At S1006, the receiving device decodes a plurality of symbols corresponding to the data unit, that is, the plurality of symbols transmitted during the duration of the transmission of the data unit.

At S1008, the receiving device determines to transmit an Acknowledge (ACK) frame using the decoded plurality of symbols. In an embodiment, receiving device determines to transmit the ACK frame the without using a result of decoding a symbol received after the duration of the transmission of the data unit.

In an embodiment, the receiving device determines to transmit an ACK frame using, among other symbols, a last decoded symbol of the plurality of symbols used to transmit the data unit, and in an embodiment, determines to transmit the ACK frame without using a result of decoding any symbol received after the last decoded symbol. As a result, the available decode time of the last decoded symbol may be increased.

FIG. 11 illustrates a process 1100 for extending a duration of a frame in order to increase the available decode time for a symbol encoded into the frame, according to an embodiment. The process 1100 may be performed during S904 of the process 900 of FIG. 9.

The process 1100 may be performed by a transmitting device that is transmitting the frame. The transmitting device may be part of a WLAN, such as a WLAN according to an IEEE 802.11 standard. The transmitting device may be an Access Point (AP).

FIG. 11 show some operations of the process 1100 being performed in a Media Access Control (MAC) layer, and other operations of the process 1100 being performed in a physical (PHY) layer. In an embodiment, the MAC layer corresponds to a MAC layer of an IEEE 802.11 standard and the PHY layer corresponds to the PHY layer of the IEEE 802.11 standard.

In the example shown in FIG. 11, the frame may be a PPDU frame including an A-MPDU. A data portion of the PPDU frame (such as the A-MPDU) may be transmitted using symbols having a symbol duration of 12.8 microseconds.

At S1104, when the process 1100 determines to perform MAC layer padding, the process 1100 proceeds to S1108. Otherwise, the process 1100 proceeds to S1110.

At S1108, the process 1100 incorporates one or more EOF MPDUs to the A-MPDU. The EOF MPDUs are appended to the end of the A-MPDU.

At S1110, when the process 1100 determines to perform bit padding in the PHY layer before performing Forward Error Correction (FEC) encoding of the A-MPDU, the process 1100 proceeds to S1112. Otherwise, the process 1100 proceeds to S1114.

At S1112, the process 1100 appends, in the PHY layer, first padding bits to the A-MPDU.

At S1114, the process 1100 encodes the A-MPDU using a FEC encoder to produce a FEC encoded data unit. When the first padding bits have been appended to the A-MPDU at S1112, the FEC encoder jointly encodes the first padding bits with information in the A-MPDU to produce the FEC encoded data unit.

At S1116, when the process 1100 determines to perform post-FEC-encoding bit padding, the process 1100 proceeds to S1120. Otherwise, the process 1100 proceeds to S1124.

At S1120, the process 1100 appends the second padding bits to the FEC encoded data unit produced at S1114.

At S1124, the process 1100 determines whether the available decode time needs to be increased. When the available decode time needs to be increased, the process 1100 proceeds to S1126. Otherwise, the process 1100 proceeds to S1130.

At S1126, the process 1100 appends an extension to an end of the frame, and includes a length indication in an HE-SIG field of the frame. The length indication may indicate a duration of the extension to avoid length ambiguity. The indication may indicate whether the duration of the extension is greater than 12 microseconds.

At S1130, the process 1100 sets a length field of the L-SIG field so that the length field can indicate the end of the frame. The process 1100 then ends.

In above explanations and figures, illustrative embodiments were provided to allow a person of skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has made to one or more IEEE Std 802.11 standards, embodiments are not limited thereto, and a person of skill in the art in light of the teachings and disclosures herein would understand how the present disclosures apply to any wireless operation that operates in licensed or unlicensed bands.

The above explanation and figures are applied to the HE PPDU, the HE-SIG field and the like of IEEE 802.11ax amendment, but they can also be applied to a PPDU, an SIG field, and the like of the next amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method performed by a wireless communication device, the method comprising:
   receiving capability information of a receiving device from the receiving device, the capability information including a plurality of respective required additional processing times for a plurality of transmission formats;
   generating a High Efficiency Physical Layer Convergence Procedure (PLCP) Protocol Data Unit (HE PPDU) frame;
   creating a padded frame by appending an addition to the generated HE PPDU frame, the addition including padding bits, an extension having a non-zero signal strength, or both; and
   transmitting the padded frame;
   wherein the addition provides the required additional processing time, and wherein each transmission format is a combination of two or more transmission types, each transmission type comprising a modulation type, a coding rate, a bandwidth, a type of Forward Error Correction, a frame data rate, an encoding type, whether Space Frequency Block Coding is used, or whether Space Time Block Coding is used.

2. The method of claim 1,
   wherein the generated HE PPDU frame includes an Aggregate Media Access Control (MAC) Protocol Data Unit (A-MPDU),
   wherein the addition includes the extension having a non-zero signal strength; and
   wherein the extension having the non-zero signal strength includes a null Media Access Control (MAC) Protocol Data Unit (MPDU).

3. The method of claim 1, wherein when the addition includes padding bits, appending the addition includes appending bits in the physical (PHY) layer before performing an encoding to create the padded frame.

4. A method performed by a first wireless communication device, the method comprising:
   transmitting capability information of the first wireless communication device to a second wireless communication device, the capability information including a plurality of respective required additional processing times for a plurality of transmission formats; and
   receiving, from the second wireless communication device, a padded frame, the padded frame including:
   a High Efficiency Physical Layer Convergence Procedure (PLCP) Protocol Data Unit (HE PPDU) frame, and an addition appended to the HE PPDU frame, the addition including padding bits, an extension having a non-zero signal strength, or both, wherein a duration of the addition corresponds to the required additional processing time, and wherein each transmission format is a combination of two or more transmission types, each transmission type comprising a modulation type, a coding rate, a bandwidth, a type of Forward Error Correction, a frame data rate, an encoding type, whether Space Frequency Block Coding is used, or whether Space Time Block Coding is used.

5. The method of claim 4, further comprising:
determining whether the HE PPDU frame is addressed to the first wireless communication device; and
in response to determining that the HE PPDU frame is addressed to the first wireless communication device, transmitting an acknowledgement of the HE PPDU frame to the second wireless communication device an interval corresponding to a Short Interframe Space after the end of the padded frame.

6. A non-transitory computer-readable media (CRM) including computer programming instructions that, when executed by a wireless communication device, cause the wireless communication device to perform steps comprising:

receiving capability information of a receiving device from the receiving device, the capability information including a plurality of respective required additional processing times for a plurality of transmission formats;

generating a High Efficiency Physical Layer Convergence Procedure (PLCP) Protocol Data Unit (HE PPDU) frame;

creating a padded frame by appending an addition to the generated HE PPDU frame, the addition including padding bits, an extension having a non-zero signal strength, or both; and transmitting the padded frame;

wherein the addition provides the required additional processing time, and wherein each transmission format is a combination of two or more transmission types, each transmission type comprising a modulation type, a coding rate, a bandwidth, a type of Forward Error Correction, a frame data rate, an encoding type, whether Space Frequency Block Coding is used, or whether Space Time Block Coding is used.

7. The non-transitory CRM of claim 6,
wherein the generated HE PPDU frame includes an Aggregate Media Access Control (MAC) Protocol Data Unit (A-MPDU),
wherein the addition includes the extension having a non-zero signal strength; and
wherein the extension having the non-zero signal strength includes a null Media Access Control (MAC) Protocol Data Unit (MPDU).

8. The non-transitory CRM of claim 6, wherein when the addition includes padding bits, appending the addition includes appending bits in the physical (PHY) layer before performing an encoding to create the padded frame.

9. A non-transitory computer-readable media (CRM) including computer programming instructions that, when executed by a first wireless communication device, cause the wireless communication device to perform steps comprising:

transmitting capability information of the first wireless communication device to a second wireless communication device, the capability information including a plurality of respective required additional processing times for a plurality of transmission formats; and receiving, from the second wireless communication device, a padded frame, the padded frame including:
a High Efficiency Physical Layer Convergence Procedure (PLCP) Protocol Data Unit (HE PPDU) frame, and
an addition appended to the HE PPDU frame, the addition including padding bits, an extension having a non-zero signal strength, or both, wherein a duration of the addition corresponds to the required additional processing time, and wherein each transmission format is a combination of two or more transmission types, each transmission type comprising a modulation type, a coding rate, a bandwidth, a type of Forward Error Correction, a frame data rate, an encoding type, whether Space Frequency Block Coding is used, or whether Space Time Block Coding is used.

10. The non-transitory CRM of claim 9, wherein the steps further comprise:
determining whether the HE PPDU frame is addressed to the first wireless communication device; and
in response to determining that the HE PPDU frame is addressed to the first wireless communication device, transmitting an acknowledgement of the HE PPDU frame to the second wireless communication device an interval corresponding to a Short Interframe Space after the end of the padded frame.

11. A wireless communication device comprising:
a wireless receiver,
a wireless transmitter, and
a processor coupled to the wireless receiver and to the wireless transmitter,
wherein the wireless communication device is configured to perform steps comprising:
receiving capability information of a receiving device from the receiving device, the capability information including a plurality of respective required additional processing times for a plurality of transmission formats;
generating a High Efficiency Physical Layer Convergence Procedure (PLCP) Protocol Data Unit (HE PPDU) frame;
creating a padded frame by appending an addition to the generated HE PPDU frame, the addition including padding bits, an extension having a non-zero signal strength, or both; and
transmitting the padded frame;
wherein the addition provides the required additional processing time, and
wherein each transmission format is a combination of two or more transmission types, each transmission type comprising a modulation type, a coding rate, a bandwidth, a type of Forward Error Correction, a frame data rate, an encoding type, whether Space Frequency Block Coding is used, or whether Space Time Block Coding is used.

12. The wireless communication device of claim 11,
wherein the generated HE PPDU frame includes an Aggregate Media Access Control (MAC) Protocol Data Unit (A-MPDU),
wherein the addition includes the extension having a non-zero signal strength; and wherein the extension having the non-zero signal strength includes a null Media Access Control (MAC) Protocol Data Unit (MPDU).

13. The wireless communication device of claim 11, wherein when the addition includes padding bits, appending the addition includes appending bits in the physical (PHY) layer before performing an encoding to create the padded frame.

14. A first wireless communication device comprising:
a wireless receiver,
a wireless transmitter, and
a processor coupled to the wireless receiver and to the wireless transmitter,
wherein the first wireless communication device is configured to perform steps comprising:
transmitting capability information of the first wireless communication device to a second wireless communication device, the capability information including a plurality of respective required additional processing times for a plurality of transmission formats; and
receiving, from the second wireless communication device, a padded frame, the padded frame including:
a High Efficiency Physical Layer Convergence Procedure (PLCP) Protocol Data Unit (HE PPDU) frame, and
an addition appended to the HE PPDU frame, the addition including padding bits, an extension having a non-zero signal strength, or both,
wherein a duration of the addition corresponds to the required additional processing time, and
wherein each transmission format is a combination of two or more transmission types, each transmission type comprising a modulation type, a coding rate, a bandwidth, a type of Forward Error Correction, a frame data rate, an encoding type, whether Space Frequency Block Coding is used, or whether Space Time Block Coding is used.

15. The first wireless communication device of claim 14, wherein the steps further comprise:
determining whether the HE PPDU frame is addressed to the first wireless communication device; and
in response to determining that the HE PPDU frame is addressed to the first wireless communication device, transmitting an acknowledgement of the HE PPDU frame to the second wireless communication device an interval corresponding to a Short Interframe Space after the end of the padded frame.

* * * * *